US009403994B2

(12) United States Patent
Fletcher

(10) Patent No.: US 9,403,994 B2
(45) Date of Patent: Aug. 2, 2016

(54) ANTI-CORROSIVE PARTICLES

(75) Inventor: Timothy E. Fletcher, Worms (DE)

(73) Assignee: Grace GmbH & Co. KG, Worms (DE)

( * ) Notice: Subject to any disclaimer, the term of this patent is extended or adjusted under 35 U.S.C. 154(b) by 1214 days.

(21) Appl. No.: 13/133,498

(22) PCT Filed: Dec. 8, 2009

(86) PCT No.: PCT/EP2009/008762
§ 371 (c)(1),
(2), (4) Date: Jun. 8, 2011

(87) PCT Pub. No.: WO2010/066403
PCT Pub. Date: Jun. 17, 2010

(65) Prior Publication Data
US 2011/0233473 A1 Sep. 29, 2011

Related U.S. Application Data

(60) Provisional application No. 61/201,179, filed on Dec. 8, 2008.

(51) Int. Cl.
C09D 5/08 (2006.01)
C09C 1/30 (2006.01)
C09C 1/36 (2006.01)
C09C 1/40 (2006.01)

(52) U.S. Cl.
CPC ............. *C09D 5/082* (2013.01); *C09C 1/3045* (2013.01); *C09C 1/3653* (2013.01); *C09C 1/40* (2013.01); *C01P 2004/61* (2013.01); *C01P 2006/14* (2013.01); *C01P 2006/16* (2013.01)

(58) Field of Classification Search
CPC ...... C09D 5/08; C09D 7/1216; C09D 7/1291; C09D 5/082; C04B 2235/96; C09C 1/28; C09C 1/36; C09C 1/40
USPC .............. 106/14.05, 14.21; 524/472; 252/387
See application file for complete search history.

(56) References Cited

U.S. PATENT DOCUMENTS

| 2,657,149 A | 10/1953 | Iler ............................. 106/308 |
| 2,692,863 A | 10/1954 | Iler ............................. 252/309 |
| 2,974,105 A | 3/1961 | Iler ............................. 252/309 |
| 3,925,211 A | 12/1975 | Schumann et al. ...... 210/500 M |
| 4,139,599 A | 2/1979 | Tomlinson et al. ........... 423/308 |
| 4,247,526 A | 1/1981 | Jarvis et al. .................... 423/266 |
| 4,294,621 A | 10/1981 | Maurer et al. ................. 106/306 |
| 4,294,808 A | 10/1981 | Wasel-Nielen et al. ........ 423/305 |
| 4,337,092 A | 6/1982 | Hestermann et al. ....... 106/14.05 |
| 4,419,137 A | 12/1983 | Cayless et al. ............. 106/14.39 |
| 4,474,607 A | 10/1984 | Goldie et al. ............. 106/14.39 |
| 4,629,588 A | 12/1986 | Welsh et al. ................. 260/428 |
| 4,643,769 A | 2/1987 | Othen .......................... 106/1.17 |
| 4,687,595 A * | 8/1987 | Howes et al. ................. 252/387 |
| 4,734,226 A | 3/1988 | Parker et al. ................. 260/420 |
| 4,849,297 A | 7/1989 | Mansell et al. ............... 428/457 |
| 4,939,115 A | 7/1990 | Parker et al. ................. 502/401 |
| 5,024,825 A | 6/1991 | Buhl et al. .................... 423/309 |
| 5,041,241 A * | 8/1991 | Fletcher ....................... 252/387 |
| 5,108,728 A | 4/1992 | Rau et al. ..................... 423/309 |
| 5,123,964 A | 6/1992 | Kerner et al. ............ 106/287.34 |
| 5,126,074 A | 6/1992 | Bittner ........................ 252/387 |
| 5,231,201 A | 7/1993 | Welsh et al. .................. 554/191 |
| 5,336,794 A | 8/1994 | Pryor et al. ................... 554/206 |
| 5,405,493 A | 4/1995 | Goad ........................... 156/651 |
| 5,651,921 A | 7/1997 | Kaijou ......................... 252/309 |
| 5,665,149 A | 9/1997 | Gotzmann et al. ......... 106/14.12 |
| 5,827,363 A | 10/1998 | Darsillo et al. ............... 106/484 |
| 5,968,470 A | 10/1999 | Persello ....................... 423/339 |
| 6,025,455 A | 2/2000 | Yoshitake et al. .............. 528/10 |
| 6,051,672 A | 4/2000 | Burns et al. ................... 528/10 |
| 6,083,308 A * | 7/2000 | Fletcher ..................... 106/14.12 |
| 6,139,616 A | 10/2000 | Nagayama et al. ........... 106/431 |
| 6,376,559 B1 | 4/2002 | Komoto et al. ................. 516/34 |
| 6,380,265 B1 * | 4/2002 | Pryor et al. ..................... 516/85 |
| 6,403,526 B1 | 6/2002 | Lussier et al. ................ 502/439 |
| 6,485,549 B1 | 11/2002 | Novak et al. ............... 106/14.44 |
| 6,890,648 B2 | 5/2005 | Yano et al. .................... 428/331 |
| 7,033,678 B2 | 4/2006 | Nakanishi et al. ............ 428/659 |
| 7,220,297 B2 | 5/2007 | Pipko et al. ................ 106/14.39 |
| 7,244,780 B1 | 7/2007 | Robinson et al. ............. 524/441 |
| 7,348,068 B2 * | 3/2008 | Matsuda et al. .............. 428/626 |
| 7,442,290 B2 | 10/2008 | Shan et al. ..................... 208/46 |
| 2002/0031679 A1 | 3/2002 | Yano et al. .................... 428/626 |
| 2004/0091963 A1 | 5/2004 | McMurray et al. ......... 435/69.1 |
| 2004/0168614 A1 | 9/2004 | Pipko et al. .................. 106/499 |
| 2004/0224170 A1 | 11/2004 | Nakanishi et al. ............ 428/458 |
| 2004/0249049 A1 | 12/2004 | Christian et al. ............. 524/492 |
| 2005/0047985 A1 * | 3/2005 | Mori et al. .................... 423/335 |
| 2005/0148832 A1 | 7/2005 | Reghabi et al. .............. 600/309 |
| 2005/0228106 A1 | 10/2005 | Schaefer et al. ............. 524/492 |

(Continued)

FOREIGN PATENT DOCUMENTS

| DE | 1767332 | 4/1968 | |
| DE | 1 567 609 | 5/1970 | ............. C01B 25/32 |

(Continued)

*Primary Examiner* — Mark Kopec
(74) *Attorney, Agent, or Firm* — Beverly J. Artale

(57) ABSTRACT

The present invention relates to anti-corrosive particles based on inorganic oxide products such as silica or alumina modified with polyvalent metal cations optionally comprising anions of weak acids which may be inorganic or organic in nature and their conjugate species. In particular, the present invention is concerned with anti-corrosive pigment particles comprising inorganic oxides or mixtures of inorganic oxides displaying mesoporosity and/or macroporosity such that the average pore size, averaged over the mixture of inorganic oxides where more than one oxide is involved is greater than 2 nm and the average pore volume is greater than 0.2 ml/g. The present invention is also related to methods of making such particles and to anti-corrosive compositions made with them. The present invention further relates to articles to which the anti-corrosive compositions have been applied.

21 Claims, No Drawings

(56) References Cited

U.S. PATENT DOCUMENTS

| | | | |
|---|---|---|---|
| 2007/0012220 A1 | 1/2007 | Matsuda et al. | 106/462 |
| 2007/0048550 A1 | 3/2007 | Millero et al. | 428/704 |
| 2007/0088111 A1 | 4/2007 | Maksimovic et al. | 524/401 |
| 2009/0062115 A1* | 3/2009 | Ackerman et al. | 502/263 |
| 2011/0048275 A1* | 3/2011 | Fletcher | 106/14.05 |
| 2011/0281993 A1* | 11/2011 | Pinnavaia et al. | 524/445 |

FOREIGN PATENT DOCUMENTS

| | | | |
|---|---|---|---|
| DE | 2840820 | 9/1978 | C01B 25/16 |
| DE | 2849712 | 11/1978 | C09C 1/02 |
| EP | 0170356 | 1/1989 | C23F 11/18 |
| EP | 0412686 | 2/1991 | C09C 1/36 |
| EP | 0316066 | 3/1992 | C23F 11/18 |
| EP | 522678 | 1/1993 | C09C 3/06 |
| EP | 1291453 | 3/2003 | C23C 28/00 |
| EP | 0760387 | 10/2004 | C09B 57/10 |
| EP | 1172420 | 10/2005 | C09D 5/08 |
| EP | 1475226 | 1/2007 | B32B 15/08 |
| GB | 825976 | 12/1959 | |
| GB | 914707 | 1/1963 | |
| GB | 915512 | 1/1963 | |
| GB | 918802 | 2/1963 | |
| GB | 988330 | 4/1965 | |
| GB | 1089245 | 11/1967 | C01B 25/32 |
| GB | 1293945 | 10/1972 | B26D 7/20 |
| GB | 1567609 | 5/1980 | B29H 1/02 |
| WO | 9317967 | 9/1993 | C01F 7/02 |
| WO | 2000/022054 | 4/2000 | |
| WO | 2009/065569 | 5/2009 | |

* cited by examiner

ANTI-CORROSIVE PARTICLES

CROSS REFERENCE TO RELATED APPLICATION

This application claims the benefit of U.S. Patent Application Ser. No. US61/201,179, filed Dec. 8, 2008.

FIELD OF THE INVENTION

The present invention relates to anti-corrosive particles based on inorganic oxide products such as silica or alumina modified with polyvalent metal cations optionally comprising anions of weak acids which may be inorganic or organic in nature and their conjugate species. The present invention is also related to methods of making such particles and to anti-corrosive compositions made with them. The present invention further relates to articles to which the anti-corrosive compositions have been applied.

BACKGROUND OF THE INVENTION

It is known that certain cations and anions have corrosion inhibiting properties and that compounds containing them can be included in anti-corrosive compositions that are intended to provide adhesion and corrosion inhibiting properties to metallic surfaces and structures. Typical examples include cations of calcium, magnesium, strontium, barium, aluminium, manganese, zinc, lead, chromium, cerium and other rare earth elements together with anions such as silicate, metaborate, borate, borosilicates, chromate, molybdate, nitrophthalate, phosphate, hydrogen phosphate, phosphite, polyphosphate, phosphosilicates, phosphonates and phosphonocarboxylates.

The cations may be combined with the anions to form slightly soluble metal salts. Cations or anions may also be chemically combined with inorganic oxides such as those based on silica or alumina to produce ion-modified anti-corrosive compounds. Additionally, cations of some metals such as lead and zinc in the form of their oxides are able to enhance the anti-corrosive properties of anti-corrosive compositions. Typical examples are lead monoxide, red lead and zinc oxide.

Of course, the classic inhibitors based on lead compounds and chromates are well-known to be associated with environmental and health and safety concerns and have largely been phased out, although there are still applications where chromates continue to be used, such as in anti-corrosive coatings for aircraft applications and particular applications within coil coatings to do with exterior buildings or metallic substrates such as Galvalume, providing continued motivation for further development in the field of anti-corrosion.

Many of the replacements for lead and chromium based compounds have however in practice been based on other heavy metals such as zinc, raising further concerns about health and safety and the environment. Rare earth elements such as cerium are thought to provide pigments that are less objectionable than those based on chromium, whereas unlike calcium and magnesium, concerns may still exist if strontium and barium compounds are considered, even though as Group IIA elements, these are not regarded as heavy metals.

As mentioned above, the inhibitive compounds may be in the form of sparingly water-soluble salts and can for example be prepared by a process of particle growth and precipitation from slurries or solutions in the presence of the required cations and anions under suitable conditions. Typical examples of lead and chromate-free inhibitive compounds based on sparingly soluble salts and processes for preparing them can be found in or referenced by U.S. Pat. Nos. 4,247,526, 4,139,599, 4,294,621, 4,294,808, 4,337,092, 5,024,825, 5,108,728, 5,126,074, 5,665,149, 6,083,308 and 7,220,297 together with U.S. Patent Application Nos. 2007/0012220, 2007/0012220 and 2004/0168614 as well as GB Patents Nos. 825,976, 914,707, 915,512, 1,089,245, DE Patents Nos. 2,849,712, 2,840,820, and 1,567,609 and EP Patent No. 522,678, the entire subject matter of which is incorporated herein by reference.

The inhibitive compounds may also be in the form of particles of inorganic oxides such as silica, silicates, alumina and aluminosilicates comprising additional inhibitive cations and anions. These inhibitive compounds can for example be prepared by a process of precipitation or gelation of the oxide in the presence of the required cations and anions under suitable conditions. Typical examples of such inhibitive compounds and processes for making them may be found in U.S. Pat. No. 4,849,297 and GB 918,802, the entire subject matter of which is incorporated herein by reference. GB 918,802 refers to a precipitated calcium silicate having a $SiO_2:CaO$ ratio in excess of 1:1 and usually between 2:1 and 5:1. U.S. Pat. No. 4,849,297 refers to the precipitation of an amorphous calcium containing silica having a low surface area and oil absorption and a calcium content of 6 to 9% by weight expressed as CaO.

Inhibitive compounds based on inorganic oxides can alternatively be made through a process of ion-exchange, in which surface protons and hydroxyl groups of the pre-formed oxide are replaced by contacting the oxide with a solution containing the required inhibitive cations and anions, again under suitable conditions. Processes for making such exchanged oxides may be found in or referenced by U.S. Pat. Nos. 5,405,493, 4,687,595, 4,643,769, 4,419,137, 4,474,607, and 5,041,241, together with EP 0412686, the entire subject matter of which is incorporated herein by reference. Preferentially, the oxides referred to, such as silica gels are microporous, having average pore sizes of around 2 nm. U.S. Pat. No. 5,041,241 refers to a two component blend of calcium containing microporous silicas. Other examples concerning ion-exchanged aluminosilicate compounds are U.S. Pat. No. 6,139,616 and US 2004/0091963 the entire subject matter of which is incorporated herein by reference.

Of course, from the above description, combinations of inhibitive compounds based on sparingly soluble salts and those based on inorganic oxides could be prepared simultaneously in various ways according to the composition of the solution or slurry from which the inhibitive compounds are to be prepared and the processing route, allowing in principle for a great variety in properties displayed by the resulting inhibitive compound.

In many cases, the films and coatings employed in anti-corrosion have a certain permeability to water and it is believed that the mechanism of corrosion inhibition provided by the aforementioned anti-corrosive compounds involves gradual dissolution of the compounds in water, releasing ions as the active inhibitors. For such systems to be effective over a long period, the solubility of the compound is particularly important. If the compound is too soluble, blistering of the coating may occur and the compound will be rapidly depleted; if it is insufficiently soluble the compound will be ineffective. Whether the inhibitive compound is a sparingly soluble salt, or based on an inorganic oxide or is some combination of the two, the typical solubility of such compounds suitable for use in films and coatings results in inhibitive ion concentrations in aqueous media of around $10^{-5}$M to $10^{-2}$M.

For inhibitive compounds based on inorganic oxides, the inorganic oxide may itself have a certain solubility with respect to the provision of inhibitive substances, according to the nature of the environment in which the corrosion inhibiting particles are used e.g. in the case of silica, silicic acid has a background solubility of about $10^{-3}$M with the concentration of silicate being pH dependent and having a value of $10^{-2}$M for example at a pH of about 10.5.

It is however sometimes believed that these types of corrosion inhibiting particles can act to release inhibitive cations and anions into solution by ion exchange with aggressive ions existing in that environment as an additional or alternative mechanism of action to one based on dissolution. The rate of release of the corrosion inhibiting ions would then be influenced by the permeability of the film or coating to the exchanging ions in addition to or rather than dissolution of inhibitive ions into the permeating aqueous environment. Corrosion inhibiting ions would in that case be released to a greater extent from the inorganic oxide in those areas where the desired barrier properties of the coating were weakest, leading thereby to improved performance properties.

The anti-corrosive compounds referred to above are usually made available in the form of dry powders, making use of washing, drying and milling operations as required as additional processing steps and average particle sizes of the powders are usually about 1 to 2 microns or more, although can be less than 1 micron.

In many practical anti-corrosive systems such as coating formulations, combinations of anti-corrosive pigments are employed in the development of lead and chromate-free formulations, which may or may not include other heavy metal containing pigments. Apart from optimizing performance, such combinations can in some cases also allow the heavy metal content of the formulation to be reduced. Typical examples of such combinations can be found in U.S. Pat. Nos. 6,485,549, 6,890,648, 7,033,678, 7,244,780 and US Patent Application Nos: 2002/0031679, 2004/0224170, 2005/0148832, 2007/0048550 and 2007/0088111 as well as EP1172420, EP1291,453 and EP1475226 and WO2000022054, the entire subject matter of which is incorporated herein by reference.

The performance and properties obtainable from the less objectionable pigments are not however in general always at the level associated with the traditional lead and chromate containing systems and for other heavy metal containing pigments, attempting to lower or eliminate their use may introduce further compromise in performance, a situation that continues to provide motivation to find improved alternatives to the traditionally used pigments. Of increasing concern as well are the costs associated with pigment production, arising from increasing energy costs and ease of processing as well as raw material costs in relation to the cost-effectiveness of the final anti-corrosive system into which the pigments are incorporated. The present invention attempts to address these various issues.

SUMMARY OF THE INVENTION

The present invention relates to anti-corrosive particles based on inorganic oxide products such as silica or alumina modified with polyvalent metal cations optionally comprising anions of weak acids which may be inorganic or organic in nature and their conjugate species. Mixtures of inorganic oxides may be involved as may mixtures of polyvalent metal cations and anions of weak acids.

Regarding the compositions envisaged, the number of moles of the $i^{th}$ cation, anion or oxide can be represented by the symbols $m_i^c$, $m_i^a$ and $m_i^o$ respectively. The total number of moles of each component i.e. cation, anion and oxide is then given by the sum over all cations, anions and oxides that are to be employed in any particular composition, where for convenience in notation, an upper bar is used to signify that more than one cation, anion or oxide may be involved in the pigment composition. Thus:

$$\Sigma m_i^c = \overline{m_c}$$

$$\Sigma m_i^a = \overline{m_a}$$

$$\Sigma m_i^o = \overline{m_o}$$

where $\overline{m_c}$, $\overline{m_a}$ and $\overline{m_o}$ are the total number of moles of cations, anions and oxides respectively. Similarly, $\overline{m_{c,a}}$ and $\overline{m_{c,o}}$ are the total number of moles of cations associated with the anion and oxide respectively. The proportion of the $i^{th}$ cation, anion and oxide as a fraction of the total number of cations, anions and oxides are assigned values $c_i$, $a_i$ and $o_i$ according to the composition that is desired. Thus:

$$\frac{m_i^c}{\overline{m_c}} = c_i$$

$$\frac{m_i^a}{\overline{m_a}} = a_i$$

And $$\frac{m_i^o}{\overline{m_o}} = o_i$$

The total number of polyvalent metal cations ($\overline{m_c}$), inorganic oxides ($\overline{m_o}$) and anions ($\overline{m_a}$) making up the product expressed in moles, is determined by the following set of equations, where the symbols s and n refer to the surface area per gram of oxide and number of surface hydroxyl groups per nm$^2$ of oxide, determined as an average where more than one oxide is involved:

$$\overline{m_c} = \overline{m_{c,o}} + \overline{m_{c,a}}$$

where $$\overline{m_{c,o}} = \frac{f \times s \times n \times \overline{m_o} \times M_o \times 10^{18}}{\overline{v_c} \times N_A} = b \times \overline{m_o} \quad f \leq 1$$

and $$\overline{m_{c,a}} = \frac{\overline{v_a} \times \overline{m_a}}{\overline{v_c}} \times s = c \times \overline{m_a} \quad s > 1 \text{ or } s \leq 1$$

using the symbols b and c to represent the various terms in each equation, together with a relationship expressing the desired ratio r of anion to oxide:

$$\frac{\overline{m_a}}{\overline{m_o}} = \frac{1+b}{1+c} \times r \quad r \geq 0$$

using as a basis the constraint that:

$$\overline{m_a} + \overline{m_o} + \overline{m_c} = 100$$

The symbol f gives the theoretical proportion of surface hydroxyl groups involved in treatment with a cation and the symbol s determines the stoichiometric ratio between cations and anions. The symbols $\overline{v_c}$ and $\overline{v_a}$ represent the average valence of the cations and anions making up the composition and are determined in each case by the following form:

$$\overline{v_i} = \frac{\sum z_i \times u_i}{\sum u_i}$$

Here, $z_i$ and $u_i$ are the valence and the proportion of the $i^{th}$ cation or anion as a fraction of the total number of cations or anions i.e. $c_i$ and $a_i$. In the above, or in converting moles to weights, $M_c$, $M_a$ and $M_o$ are the molecular weights of the cation, anion and oxide or represent average values as appropriate. $N_a$ is the Avagadro Number. The above set of equations, together with the values assigned to $c_i$, $a_i$, $o_i$, f, s and r define the compositions envisaged according to the present invention.

In particular, the present invention is concerned with anti-corrosive pigment particles comprising inorganic oxides or mixtures of inorganic oxides displaying mesoporosity and/or macroporosity such that the average pore size, averaged over the mixture of inorganic oxides where more than one oxide is involved, is greater than 2 nm and the average pore volume is greater than 0.2 ml/g. It will be seen that in general, where more than one inorganic oxide is involved, at least one inorganic oxide will contain meso or macro pores. The anti-corrosive particles of the present invention have a pH in the range of about 3 to 11 and solubilities typically fall within the range of about $10^{-5}$ to $10^{-2}$M, according to the actual composition selected.

Compared to the known pigments, the inventive materials have surprisingly been found to provide improved anti-corrosive performance and have less effect on other coating properties such as those related to rheological and film curing processes. Additionally, during pigment production, reduced viscosities can be attained allowing higher concentrations of active materials to be processed. The design of the pigments is also such that during exothermic reactions better temperature control can be realized, allowing temperature sensitive phase structures to be more easily produced.

The present invention is also related to methods of making such particles and to anti-corrosive compositions made with them. The anti-corrosive compositions may be aqueous, non-aqueous or solvent-free protective films, primers, coatings, adhesives, sealants, metal pre-treatments and other surface treatment films that are intended to provide adhesion and corrosion inhibiting properties to metallic surfaces and structures and where improvements in anti-corrosive properties are required. As described herein, all of these fields of application are encompassed by the single term "coating".

DETAILED DESCRIPTION

The present invention relates to anti-corrosive particles based on inorganic oxide products such as silica or alumina modified with polyvalent metal cations optionally comprising anions of weak acids which may be inorganic or organic in nature and their conjugate species. Mixtures of inorganic oxides may be involved as may mixtures of polyvalent metal cations and anions of weak acids.

As defined herein, the term "inorganic oxides" means oxides of metals or metalloids. Metals include those elements on the left of the diagonal line drawn from boron to polonium on the periodic table. Metalloids or semi-metals include those elements that are on this line and include also silicon.

Examples of inorganic oxides include silica, silicates, alumina, aluminosilicates, titania, zirconia, ceria and the like, or mixtures thereof.

Inorganic oxides may be in any shape from spherical to any non-spherical shape, and may be in the form of a gel, a precipitate, a sol (colloidal), fumed or other common form readily recognized in the art. Such oxide particles may for example be prepared according to the processes set forth in or referenced by U.S. Pat. Nos. 5,336,794, 5,231,201, 4,939,115, 4,734,226, and 4,629,588 as well as DE1,000,793, GB 1,263,945, DE 1,767332, U.S. Pat. Nos. 5,123,964, 5,827,363, 5,968,470, 6,403,526, 7,442,290, US2004/0249049 US 2005/0228106 and WO1993017967, the entire subject matter of which is incorporated herein by reference. Details regarding methods of making silica and other oxide particles and their properties may also be found in textbooks such as "The Chemistry of Silica" by R. K.ller, John Wiley & Sons, 1979, "Sol-Gel Science" by C. J. Brinker and G. W. Scherer, Academic Press, 1990, "Small Particles Technology" by J. E. Otterstedt and D. A. Brandreth, Springer, 1998, "Preparation of Solid Catalysts" by G. Ertl, H. Knoezinger and J. Weitkamp, Wiley-VCH, 1999 and "Encyclopedia of Surface and Colloid Science" by A. T. Hubbard, CRC Press, 2002, the entire subject matter of which is incorporated herein by reference. These kinds of particles are also commercially available, such as, for example, from W. R. Grace & Co.-Conn. under the trade names SYLOID®, PERKASIL® or LUDOX®.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a composition, concentrations, volumes, process temperatures, process times, recoveries or yields, flow rates, and like values, and ranges thereof, employed in describing the embodiments of the disclosure, refers to variation in the numerical quantity that can occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about" the claims appended hereto include equivalents to these quantities.

Regarding the compositions envisaged, the number of moles of the $i^{th}$ cation, anion or oxide can be represented by the symbols $m_i^c$, $m_i^a$ and $m_i^o$ respectively. The total number of moles of each component i.e. cation, anion and oxide is then given by the sum over all cations, anions and oxides that are to be employed in any particular composition, where for convenience in notation, an upper bar is used to signify that more than one cation, anion or oxide may be involved in the pigment composition. Thus:

$$\Sigma m_i^c = \overline{m_c} \quad (1)$$

$$\Sigma m_i^a = \overline{m_a} \quad (2)$$

$$\Sigma m_i^o = \overline{m_o} \quad (3)$$

where $\overline{m_c}$, $\overline{m_a}$ and $\overline{m_o}$ are the total number of moles of cations, anions and oxides respectively. Similarly, $\overline{m_{c,a}}$ and $\overline{m_{c,o}}$ are the total number of moles of cations associated with the anion and oxide respectively. The proportion of the $i^{th}$ cation, anion and oxide as a fraction of the total number of cations, anions and oxides are assigned values $c_i$, $a_i$ and $o_i$ according to the composition that is desired. Thus:

$$\frac{m_i^c}{\overline{m_c}} = c_i \quad (4)$$

$$\frac{m_i^a}{\overline{m_a}} = a_i \quad (5)$$

and $$\frac{m_i^o}{\overline{m_o}} = o_i \quad (6)$$

The total number of polyvalent metal cations ($\overline{m_c}$), inorganic oxides ($\overline{m_o}$) and anions ($\overline{m_a}$) making up the product expressed in moles, is determined by the following set of equations, where the symbols s and n refer to the surface area per gram of oxide and number of surface hydroxyl groups per nm² of oxide, determined as an average where more than one oxide is involved:

$$\overline{m_c} = \overline{m_{c,o}} + \overline{m_{c,a}} \quad (7)$$

where $$\overline{m_{c,o}} = \frac{f \times s \times n \times \overline{m_o} \times M_o \times 10^{18}}{\overline{v_c} \times N_A} = b \times \overline{m_o} \quad f \leq 1 \quad (8)$$

and $$\overline{m_{c,a}} = \frac{\overline{v_a} \times \overline{m_a}}{\overline{v_c}} \times s = c \times \overline{m_a} \quad s > 1 \text{ or } s \leq 1 \quad (9)$$

using the symbols b and c to represent the various terms in each equation, together with a relationship expressing the desired ratio r of anion to oxide:

$$\frac{\overline{m_a}}{\overline{m_o}} = \frac{1+b}{1+c} \times r \quad r \geq 0 \quad (10)$$

using as a basis the constraint that:

$$\overline{m_a} + \overline{m_o} + \overline{m_c} = 100 \quad (11)$$

The symbol f gives the theoretical proportion of surface hydroxyl groups involved in treatment with a cation and the symbol s determines the stochiometric ratio between cations and anions. The symbols $\overline{v_c}$ and $\overline{v_a}$ represent the average valence of the cations and anions making up the composition and are determined in each case by the following form:

$$\overline{v_i} = \frac{\sum z_i \times u_i}{\sum u_i} \quad (12)$$

Here, $z_i$ and $u_i$ are the valence and the proportion of the $i^{th}$ cation or anion as a fraction of the total number of cations or anions i.e. $c_i$ and $a_i$. In the above, or in converting moles to weights, $M_c$, $M_a$ and $M_o$ are the molecular weights of the cation, anion and oxide or represent average values as appropriate. $N_A$ is the Avagadro Number. The above set of equations, together with the values assigned to $c_i$, $a_i$, $o_i$, f, s and r define the compositions envisaged according to the present invention.

In particular, the present invention is concerned with anti-corrosive pigment particles comprising inorganic oxides or mixtures of inorganic oxides displaying mesoporosity and/or macroporosity such that the average pore size, averaged over the mixture of inorganic oxides where more than one oxide is involved is greater than 2 nm and the average pore volume is greater than 0.2 ml/g. It will be seen that in general, where more than one inorganic oxide is involved, at least one inorganic oxide will contain meso or macro pores.

In considering the nature of the inorganic oxides of the present invention, pores are commonly classified according to size. Thus, pores having a width less than 0.7 nm are termed ultra-micropores whereas those having a width less than about 2 nm are referred to as micropores. Pores falling in the range of about 2 nm to 50 nm are labeled mesopores and those greater than about 50 nm are regarded as macropores.

A number of well-known techniques are used to determine pore volume, expressed as pore volume per unit weight, porosity, meaning the ratio of void volume to total particle volume, pore size and pore size distribution. The principle techniques are based on gas adsorption/desorption, usually with nitrogen, in which adsorption isotherms and condensation in pores are studied as a function of pressure, as well as mercury porosimetry, where the pressure required to force mercury into a pore is determined.

Gas adsorption is generally regarded as most suitable for pores in the range of about 2 to 50 nm. The presence of micropores may result in pore condensation at quite low values of the reduced pressure (the quotient of gas pressure to saturated vapour pressure), whereas towards the upper end of the mesopore range and into the macropore region, capillary condensation if it occurs at all, may only occur at values of the reduced pressure that are too close to one to be accurately measurable. Other gases such as helium or argon may be helpful for studying the micropore region. Using gas adsorption, pore volumes are determined based on the range of pore sizes accessible. Mercury and helium picnometry are useful for estimating the total pore volume and porosity.

Mercury porosimetry can be a useful supplement to gas adsorption in the upper region of the mesopore range and is necessary in the macropore range. Although pressures can be applied in principle to access pore sizes in the lower range of the mesopore region, particle compression increasingly becomes a complicating factor under these conditions.

In general, these techniques or a combination of such techniques are capable of estimating a pore size distribution for a given porous solid, from which an average pore size can be determined. Details of these standard methods along with the underlying theory can be found in texts such as "Adsorption, Surface Area and Porosity" by S. J. Gregg and K. S. W Sing, $2^{nd}$ Ed; 1982, Academic Press, London and "Characterisation of Porous Solids and Powders: Surface Area, Pore Size and Density" by S. Lowell, J. E. Shields, M. A. Thomas and M. Thommes, 2004, Springer, the entire contents of which are incorporated herein by reference. Rheological methods of estimating pore volumes are also known such as that reported in U.S. Pat. No. 6,380,265 the entire contents of which are incorporated herein by reference.

The average pore size of the anti-corrosive particles of the present invention will generally lie in the range of about 2 nm to about 100 nm. More preferably, the average pore size will lie between about 3 nm and about 80 nm, between about 3 and about 70 nm, between about 3 nm and about 60 nm and most preferably between about 4 nm and about 50 nm.

The average pore volume of the anti-corrosive particles of the present invention will generally lie in the range of about 0.2 ml/g to about 3 ml/g. More preferably, the average pore volume will lie between about 0.3 ml/g and about 2 ml/g, between about 0.3 ml/g and about 1.8 ml/g, between about 0.3 ml/g and about 1.5 ml/g, and most preferably between about 0.4 ml/g and about 1.2 ml/g.

For reasons related to the ability to incorporate corrosion inhibitors into a wide variety of film and coating systems as well as suitability with respect to corrosion resistance, the pH of an aqueous slurry of the anti-corrosive particles will in most cases typically fall within the range of about 3 to 11 although lower or higher values can be suitable depending on the actual chemistry of the coating or film in question and the nature of the metallic substrate. For the same reasons, solubilities will typically fall within the range of about $10^{-5}$ to $10^{-2}$M. These properties can be adjusted by the actual composition selected.

It will be seen that the composition may be varied by selection of the cation, anion and oxide components, assignment of the proportion of each cation, anion and oxide as a fraction of the total number of cations, anions and oxides, of the ratio of cation to anion and of the ratio of cation to oxide and then determination of the proportion of each component type from the set of equations 7 to 11. For example, if a mixture of calcium ($Ca^{2+}$), magnesium ($Mg^{2+}$) and aluminium ($Al^{3+}$) ions in the molar proportions 85:10:5 are to be employed, one mesoporous silica having a surface area of 200 $m^2$/g type, where the number n of surface hydroxyl groups per $nm^2$ of oxide is for silica surfaces typically 4.5 $nm^{-2}$ and an equimolar mixture of phosphorus and phosphoric acids, then $\overline{v}_c$ and $\overline{v}_a$ are 2.05 and 2.5 respectively. f might be assigned a value of 0.1, s might be assigned a value of 1 or less than 1 if the acid salt was desired, or greater than one if an overbased salt was desired and r might be assigned a value of about 2 if similar amounts of anion and oxide were desired.

The value of r in equation 10 can be chosen to be zero. When it is chosen not to be zero, the value will typically be such that the inorganic oxide or polyvalent cation treated inorganic oxide components are present in an amount of at least 5% by weight of the anti-corrosive particles. More preferably, this amount will be at least 10% by weight, at least 15% by weight, at least 20% by weight, at least 25% by weight and most preferably at least 30% by weight.

Preferred cations are those of calcium ($Ca^{2+}$), magnesium ($Mg^{2+}$), zinc ($Zn^{2+}$), manganese ($Mn^{2+}$), and cations of the rare earth elements such as cerium ($Ce^{3+}/Ce^{4+}$) cations, but other suitable cations may be cobalt ($Co^{2+}$), lead ($Pb^{2+}$), strontium ($Sr^{2+}$), lithium ($Li^+$), barium ($Ba^{2+}$) and aluminium ($Al^{3+}$). In a more typical embodiment, the polyvalent metal ions include those of calcium, magnesium, manganese, zinc, and rare earth elements such as cerium.

Anion components include a variety of phosphorus and phosphorus free substances. Examples of phosphorus containing substances include phosphorus acid, hydrogen phosphate, phosphate, phosphoric acid, phosphite, phosphosilicates, tri- and polyphosphoric acids, organophosphonic acids containing one phosphonic acid group per molecule such as 2-hydroxyphosphonoacetic acid, 2-phosphonobutane-1,2,4-tricarboxylic acid, phosphonated oligomers and polymers of maleic and acrylic acids as well as co-oligomers and copolymers thereof. Other examples include organophosphonic acids containing two or more phosphonic acid groups per molecule like diphosphonic acids such as alkylmethane-1-hydroxy-1,1-diphosphonic acids where the alkyl group may be substituted or unsubstituted and contain from 1 to 12 carbon atoms e.g. methyl-1-hydroxy-1,1-diphosphonic acid or propyl-1-hydroxy-1,1-diphosphonic acid. Also suitable are amino compounds containing two or more N-alkylene phosphonic acid groups per molecule such as alkylamino-di (alkylene phosphonic acids) where the alkyl group can be substituted or unsubstituted and have from 1-12 carbon atoms e.g propyl, isopropyl, butyl, hexyl, or 2-hydroxyethyl and the alkylene group may have from 1 to 5 carbon atoms as well as amino-tri(alkylene phosphonic acids) such as nitrilo-tris-(methylene phosphonic acid) and nitrilo-tris-(propylene phosphonic acid). Other suitable aminoderivatives from amino compounds are alkylene diamine-tetra-(alkylene phosphonic acids), such as ethylene diamine-tetra-(methylene phosphonic acid), dialkylene triamine-penta-(alkylene phosphonic acids such as diethylene triamine-penta-(methylene phosphonic acid) and so on.

Phosphorus free substances include silicate, borate, borosilicates, metaborate, molybdate, nitrophthalates, permanganate, manganate, vanadate, tungstate, aliphatic and aromatic carboxylic acids and carboxylates with one or more than one carboxylic acid groups per molecule and carbon chain lengths from 2 to 24, such as acetic acid, lauric acid, stearic acid, oxalic acid, azelaic acid and tetradecanedioic acid as well as hydroxyacids which may be monocarboxylic acids with one or more hydroxyl groups such as glycolic acid, lactic acid, mandelic acid, 2,2-bis-(hydroxymethyl)-propionic acid, 2,2-bis-(hydroxymethyl)-butyric acid, 2,2-bis-(hydroxymethyl)-valeric acid, 2,2,2-tris-(hydroxymethyl)-acetic acid and 3,5.dihydroxybenzoic acid, dicarboxylic acids with one or more hydroxyl groups such as tartaric acid and tricarboxylic acids with one or more hydroxyl groups such as citric acid.

Phosphorus free substances also include polymers of methacrylic acid, acrylic acid and maleic anhydride or maleic acid as well as copolymers thereof such as acrylate-acrylic acid copolymers, olefin-maleic anhydride copolymers like isobutylene-maleic anhydride copolymers, styrene-maleic acid copolymers and vinyl alkyl ether-maleic acid copolymers like poly(vinyl methyl ether-co-maleic acid).

Phosphorus free acidic substances further include azoles and their derivatives containing two or more heteroatoms such as 1,2,4-triazole, 1,2,3-benzotriazole, tolytriazole, 5-phenyl-benzotriazole, 5-nitro-benzotriazole, 3-amino-5-mercapto-1,2,4-triazole, 1-amino-1,2,4-triazole, 1-amino-5-methyl-1,2,3-triazole, 3-amino-1,2,4-triazole, 3-mercapto-1,2,4-triazole, 3-isopropyl-1,2,4-triazole benzothiazole, 2-mercaptobenzothiazole, imidazole, 4-methyl-2-phenylimidazole, benzimidazole, 5-amino-tetrazole, 5-amino-1,3,4-thiadiazole-2-thiol, 4-methyl-4H-1,2,4-triazole-3-thiol, 5-amino-1,3,4-thiadiazole-2-thiol, 2-mercaptobenzimidazole, benzoxazole, 2-mercaptobenzoxazole and (2-benzothiazolythio)succinic acid.

Substances which may be useful for modifying the anti-corrosive particles include basic substances such as amines and alkanolamines. Basic substances include alkanolamines, which may be a monoalkanolamine, a dialkanolamine, a trialkanolamine, these being primarily the ethanolamines and their N-alkylated derivatives, 1-amino-2-propanols and their N-alkylated derivatives. 2-amino-1-propanols and their N-alkylated derivatives and 3-amino-1-propanols and their N-alkylated derivatives or a mixture thereof. Examples of suitable monoalkanolamines include 2-aminoethanol(ethanolamine), 2-(methylamino)-ethanol, 2-(ethylamino)-ethanol, 2-(butylamino)-ethanol, 1-methyl ethanolamine(isopropanolamine), 1-ethyl ethanolamine, 1-(m)ethyl isopropanolamine, n-butylethanolamine, cyclohexanolamine, cyclohexyl isopropanolamine, n-butylisopropanolamine, 1-(2-hydroxypropyl)-piperazine, 4-(2-hydroxyethyl)-morpholine and 2-Amino-1-propanol. Examples of suitable di-alkanolamines are diethanolamine(2,2'-iminodiethanol), 3-amino-1,2-propanediol, 2-amino-1,3-propanediol, diisobutanolamine(bis-2-hydroxy-1-butyl)amine), dicyclohexanolamine and diisopropanolamine(bis-2-hydroxy-1-propyl)amine). An example of a suitable trialkanolamine is tris(hydroxymethyl)aminomethane. Cyclic aliphatic amines may also be used such as morpholine, piperazine and their N-alkyl derivatives as well as fatty amines. Mixtures of any of the above phosphorus containing, phosphorus free or amine substances are also suitable. Also included are azole derivatives with amine functionality, such as 3-amino-1,2,4-triazole.

Other suitable modifiers include organofunctional silanes, well-known in the art and having the general formula $RSi(OR_1)_3$ where R is an aliphatic or aryl organic group typically of about 1 to 20 carbon atoms such as butyl-, hexyl-, phenyl- and so on in which R may also contain heteroatoms such as nitrogen or sulphur in the form of functional groups like epoxy, acrylate, methacrylate, isocyanate and so on. $R_1$ will typically be lower alkyl from 1 to about 7 carbon atoms such as methyl-, ethyl- or propyl- and so on. Di- and monoalkoxysilanes can also be used. Typical examples include methyltrimethoxy silane, methyltriethoxy silane, 3-glycidylpropyltrimethoxy silane, 3-glycidylpropyltriethoxy silane, 3-glycidylpropylmethyldiethoxy silane, 3-methacryloxypropyltrimethoxy silane, 3-aminopropyltrimethoxy silane, N-β(aminoethyl)-γ(aminopropyl)trimethoxy silane, 3-mercaptopropyltrimethoxy silane, vinyltriethoxy silane and tris[(3-trimethoxysilyl)propyl]isocyanurate, Suitable modifiers are also aluminium compounds such as aluminum hydroxychloride or sodium aluminate. Other valuable modifiers are alkyl or aryl phosphate esters of the general formula $(RO_3)PO$, where the R groups may be the same or different, typically having from 1 to 20 carbon atoms and may also contain heteroatoms such as nitrogen, sulphur or oxygen, The mono- and di-alkyl or aryl phosphate esters in which two or one of the R groups respectively is an H, are also suitable modifiers.

Preferred anion components are phosphorus acid, hydrogen phosphate, phosphate, phosphoric acid, tri- and polyphosphoric acids, borates and organophosphonic acids containing one or more phosphonic acid groups per molecule such as 2-hydroxyphosphonoacetic acid, as well as azole derivatives, such as 1,2,3-benzotriazole, 2-mercaptobenzothiazole and (2-benzothiazolythio)succinic acid. With respect to the aforementioned components, it is to be understood that the free acid form or any other partially neutralized or fully neutralized form, i.e., the conjugate species may be employed in any particular case as appropriate.

The present invention is also concerned with methods of making anti-corrosive particles. The anti-corrosive particles of the present invention are prepared by bringing into contact suitable sources of polyvalent cations, inorganic oxides and anion components as required in amounts determined by the formula previously discussed.

Suitable sources of polyvalent cations are any insoluble, partially soluble or soluble compound or salt of the cation capable of reacting with the inorganic oxide and/or anion component under the chosen conditions and include oxides, hydroxides, chlorides, sulphates, nitrates, acetates, lactates, carbonates, phosphates and so forth.

Suitable sources of anion are any insoluble, partially soluble or soluble compound or salt of the anion capable of reacting with the inorganic oxide and/or cation component under the chosen conditions. This includes the free acid form such as phosphoric acid, or its various conjugate species such as dihydrogen phosphate, hydrogen phosphate or phosphate in the case of phosphoric acid. The conjugate species may be in the form of the monovalent or polyvalent cation compound or salt such as those of sodium, potassium, ammonium, calcium, aluminium and magnesium.

The inorganic oxide component may be pre-formed, or precursors to the inorganic oxide may be used like sodium silicate, alkyl silicates such as tetraethyl orthosilicate, aluminum chloride, aluminum hydroxychloride or sodium aluminate, so that formation of the oxide or ion modified oxide occurs during preparation of the anti-corrosive particles.

In some cases, anions may not be used in the preparation of the anti-corrosive particles, corresponding to the case in equation 10 given earlier where the quantity r is chosen to be zero. In the case of cation treated inorganic oxides for example, these may be prepared by a process of precipitation or gelation of the oxide in the presence of the required cations. They may also be prepared by contacting the pre-formed oxide with a solution containing the required inhibitive cations. By way of example, the oxide may typically be stirred in water at room temperature and the pH monitored by a meter. Then the source of cation or cations (e.g. calcium hydroxide or basic zinc carbonate) is added slowly whilst not allowing the pH to rise too far (e.g., above 10.5 for silica or 12 for alumina). The pH needs to be high enough to remove protons but not so high as to dissolve the inorganic oxide. The uptake can be followed by observing the fall of pH over a period of time following the addition of the base. When the pH no longer falls then exchange is complete. In this case the proportion of polyvalent cation is given by equation 8.

Where r in equation 10 is zero and the anti-corrosive particles are to be composed of more than one inorganic oxide, the preparation can be carried out by mixing pre-formed inorganic oxides and ion-modified inorganic oxides as required. The preparation can also be carried out by simultaneous formation of the inorganic oxides and ion-modified oxides.

Where r in equation 10 is not zero and anions are to be used in the preparation of the anti-corrosive particles, the anti-corrosive particles may be prepared by mixing pre-formed substances such as sparingly soluble salts, inorganic oxides and ion-modified inorganic oxides. The particles may also be prepared by mixing inorganic oxides and ion-modified inorganic oxides as required with the appropriate sources of inhibitive cations and anions such that particle growth and precipitation of sparingly soluble salts occurs in the presence of the inorganic oxides. In this case, the proportions of polyvalent cations are determined by equations 7, 8 and 9 and the proportion of anion to inorganic oxide is determined by the value assigned to r in equation 10 subject to equation 11.

Where r in equation 10 is not zero the anti-corrosive particles may also be prepared by a process in which sparingly soluble inhibitive salts are combined with precursors to inorganic oxides like sodium silicate, alkyl silicates such as tetraethyl orthosilicate, aluminum chloride, aluminum hydroxychloride or sodium aluminate and so forth in the case of silica, alumina and aluminosilicates such that precipitation or gelation, or simply formation, of the inorganic oxide occurs, intimately associated with inhibitive cations and anions. Again, the relative proportion of ingredients are determined by the set of equations 7 to 11.

Similarly mixtures of sources of cations and anions and precursors to inorganic oxides can be prepared such that particle growth, precipitation and/or gelation of sparingly soluble compounds and oxides occur simultaneously, intimately associated with one another.

In many cases, the reactions indicated above are most conveniently carried out in a suitable solvent such as water. In other cases, preparation of the anti-corrosive particles will be more convenient by mixing sources of polyvalent cations, anions and inorganic oxides or mixing the pre-formed components of the particles in the solid state, using techniques such as dry powder mixing, simultaneous air milling, or simultaneous steam milling as well as thermally induced solid state reactions.

The method by which the anti-corrosive particles are prepared and the particular nature of the source of cation, anion and inorganic oxide components for a given set of components, can have a significant influence on the ability to control the type of particles prepared and the ease by which processing may occur.

For example, in preparing an anti-corrosive particle composed of calcium, phosphate and pre-formed silica, the viscosity of the reaction mixture and the chemical phase of the particles depends on the way in which the ingredients are brought together. If the reaction is carried out in an aqueous phase, the viscosity imparted by the silica component at a given solids content will depend on the pH and is generally lowest under acidic or alkaline conditions. The pH will be partly determined by the source of phosphate and can be made more acidic if phosphoric acid is used or more alkaline if trisodium phosphate is used.

Similarly, adding the source of calcium ions e.g. calcium hydroxide to a slurry of silica and phosphoric acid in an amount such that $\overline{m_{c,a}}$ in equation 9, the total number of moles of cations associated with the anion is in a proportion 1:1 i.e. s is two-thirds, then a dicalcium phosphate phase will form, typically as brushite. Simultaneously adding the anion and cation components to the inorganic oxide or silica component will also result in formation of a dicalcium phosphate phase provided the pH does not exceed about 5 to 7. If however, the value of r in equation 10 is selected to be sufficiently high, temperature rises during particle preparation may occur and other phases such as monetite instead of brushite are formed.

On the other hand, if the tertiary phosphate phase is desired e.g tricalcium phosphate or hydroxyapatite, this can be done by raising the pH at which the reaction is carried out, increasing the ratio of cations to anion to greater than 1:1, typically perhaps 1.5:1, adding the acid components to the cation components, or simultaneously adding the anion and cation components to the inorganic oxide or silica component provided the pH exceeds about 5 to 7 or some combination of these approaches.

If desired, the reaction mixture can be heated to temperatures typically up to 95° C. e.g. from about 20° C. to 95° C. for periods of up to 24 hours. Mixing and uniformity of the reaction mixture can be achieved by a variety of conventional means such as simple mixing or high shear mixing or a combination of these techniques. The various reactions and processes can be carried out batchwise or continuously.

Preparation of the anti-corrosive particles may be completed as necessary or desired by conventional washing, filtering, milling and drying techniques. For example, spray drying, flash drying, wet milling, air milling and steam milling are all techniques that can be used singly or in combination as needed.

If desired, the oxide or ion-modified oxide may be further modified with organofunctional silanes such as 3-glycidylpropyltrimethoxy silane or 3-aminopropyltrimethoxy silane, aluminium species such as aluminum hydroxychloride or sodium aluminate and phosphate esters such as octyl phosphate, used as treatments to the pre-formed oxide or in conjunction with precursors to the inorganic oxide. This can be helpful in enhancing anti-corrosive performance and compatibility with the media into which the anti-corrosive particles are incorporated. This procedure can also be helpful in improving properties, influencing the ease with which the particles may be prepared and used such as lowering viscosity in aqueous or solvent-based media.

Modifiers may be added at any stage in the above preparative sequences, although are typically added following formation of the particles. Where used, modifiers are typically added in amounts up to 15% by weight based on the weight of particles, but more preferably up to 10% by weight and most preferably up to 5% by weight.

Wet milling may be carried out in an aqueous phase but may also be carried out in a non-aqueous phase. For the non-aqueous embodiments, suitable solvents may be any of the known solvents commonly used in coatings applications such as alcohols, esters, ketones, glycol ethers, aromatic and aliphatic hydrocarbons, as well as aprotic solvents such as N-Methyl pyrrolidone, N-Ethyl pyrrolidone, Dimethyl sulphoxide, N,N-Dimethylformamide and N,N-Dimethylacetamide. For the case where the particles already exist as suitably small particles but in an aqueous phase either as a consequence of particle formation and growth in that phase, a situation encompassed by the embodiments described earlier, or as a result of milling larger particles in the aqueous phase, the inorganic oxides may be transferred to any of the solvent classes mentioned above by techniques known in the prior art. Examples are those discussed in the Journal of Colloidal & Interface Science 197, 360-369, 1998 A. Kasseh & E. Keh, "Transfers of Colloidal Silica from water into organic solvents of intermediate polarities" and the Journal of Colloidal & Interface Science 208, 162-166, 1998 A. Kasseh & E. Keh, "Surfactant mediated transfer of Colloidal Silica from water into an immiscible weakly polar solvent" or recited in U.S. Pat. Nos. 2,657,149, 2,692,863, 2,974,105, 5,651,921, 6,025,455, 6,051,672, 6,376,559 and GB Patent No. 988,330, the entire subject matter of which is incorporated herein by reference. Introduction of polyvalent cations, modifying components and/or combination with sparingly soluble salts may occur prior to solvent transfer or following solvent transfer.

The average particle diameter of the anti-corrosive particles of the present invention may be less than about 50 microns, about 20 microns, about 10 microns, about 9 microns, about 8 microns, about 7 microns, about 6 microns, about 5 microns, about 4 microns, about 3 microns, about 2 microns or less than about 1 micron.

The pigments have utility in aqueous, non-aqueous or solvent-free protective coatings, surface coatings, primers, adhesion promoting coatings, adhesives, sealants, thin films, metal pre-treatments and other surface treatment films and solutions where improvements in adhesion and anti-corrosive properties are required. As described herein, all of these fields of application are encompassed by the single term "coating".

The protective coatings and adhesion promoting coatings and layers may be based on any of the known types of organic and inorganic chemistries used in anti-corrosion e.g. solventborne, solvent-free and water-borne epoxy resins, polyesters resins, phenolic resins, amino resins such as melamine-formaldehyde, urea-fomaldehyde or benzoguanamine resins, vinyl resins, alkyd resins, chlorinated rubbers or cyclised rubbers, acrylic and styrene-acrylic chemistries including thermoplastic, thermosetting and self-crosslinking types, styrene-butadiene resins, epoxy-esters, radiation curable coatings, silicate based coatings such as zinc-rich silicates, sol-gel coatings based on alkyl silicates and/or colloidal silicas, films, treatments and coatings derived from organofunctional silanes, as well as acidic or alkaline metal pretreatment solutions such as those based on hexaflourosilicate, hexaflourozirconate and hexaflourotitanate chemistry, colloidal silica chemistry, sol-gel chemistry, silane chemistry and acrylic chemistry, as well as primer-pretreatment solutions such as those based on polyurethane chemistry, epoxy chemistry or radiation curing chemistry.

The anti-corrosive particles of the present invention may act as filler for the coating and may be included in relatively large amounts of up to about 40% by weight based on the composition to be applied and up to about 80% by weight based on the dry film weight. Smaller amounts in the range of about 1-10% by weight or more based on the composition are also suitable according to requirements and the nature of the coating. The anti-corrosive particles may also be utilized in combination with any of the known anti-corrosive technologies reviewed earlier. Anti-corrosive compositions and coatings containing the anti-corrosive particles of the present invention may be formulated and manufactured by any of the known methods, techniques and materials chemistry commonly employed in such compositions and coatings.

EXAMPLES

The following Examples are given as specific illustrations of the claimed invention. It should be understood, however, that the invention is not limited to the specific details set forth in the Examples.

Example 1

An anti-corrosive pigment was prepared by physically mixing a porous silica gel having a pore volume of about 1.6 mls/g as determined by $N_2$ adsorption, a microporous silica gel and a calcium treated silica, having a calcium content of 1.5 millimoles/g silica, where the silica gel employed was also microporous in a ratio of 2:1:1 by weight. Preparation of the calcium treated silica involved slow addition of a 30% by weight aqueous slurry of calcium hydroxide to a 30% by weight aqueous slurry of a microporous silica. The resultant product was aged at 90° C. for 4 hours, before filtering, washing, drying and milling to the desired particle size. The porous type of silica, a microporous silica and the calcium treated silica are obtainable as SYLOID® 244, SYLOID® AL1 and SHIELDEX® AC3, all available from W. R. Grace & Co. Conn.

Example 2

A 20% by weight aqueous slurry of precipitated silica having meso porosity and an oil absorption of about 180 as determined by DBP was treated by slow addition with a 15% by weight aqueous slurry of calcium hydroxide in an amount corresponding to a calcium content of 0.125 millimoles/g silica. The resultant product was aged at 90° C. for 4 hours, before filtering, washing, drying and milling to the desired particle size. The precipitated silica is obtainable as PERKASIL® SM604, available from W. R. Grace & Co. Conn.

Example 3

A 30% by weight aqueous slurry of a microporous silica was treated by slow addition with a 30% by weight aqueous slurry of calcium hydroxide in an amount corresponding to a calcium content of 1.5 millimoles/g silica. The resultant product was aged at 90° C. for 4 hours, before filtering, washing, drying and milling to the desired particle size. This product was physically mixed with a precipitated silica having meso porosity and an oil adsorption of about 180 as determined by DBP in a ratio of 11 parts by weight of the precipitated silica to 1 part by weight of the calcium treated silica. The precipitated silica is obtainable as PERKASIL® SM604 and the calcium treated silica as SHIELDEX® AC3, both available from W. R. Grace & Co. Conn.

Anti-corrosive tests on examples 1 to 3 were carried out in a polyester coil coating on Sendzimir galvanized steel test panels that had been treated with a chromium-free pre-treatment known as TP10475 available from Chemetall GmbH, Frankfurt. Polyester-melamine primers containing the examples were applied by applicator bar to the test panels so as to obtain a dry film thickness of about 5-7 μm and cured to a peak metal temperature of 214-226° C. Subsequently, a polyester-melamine topcoat was applied to a dry film thickness of about 20-22 μm, followed by curing to a peak metal temperature of 232-241° C. The formulations employed are given below in Table 1. SHIELDEX® C303 (available from W. R. Grace & Co. Conn.) is the principle chromate-free anti-corrosive pigment currently used in the coil coating industry and was used as a reference.

TABLE 1

Coil Coating Primer Formulations to assess Examples 1 to 3 on galvanized steel against SHIELDEX ® C303 anticorrosive pigment (values in parts by weight)

|  | 1 | 2 | 3 | 4 |
|---|---|---|---|---|
| 1). Dynapol LH820 | 60.99 | 60.99 | 60.99 | 60.99 |
| 2). Solvesso 150 | 5.65 | 5.65 | 5.65 | 5.65 |
| 3). DBE | 4.47 | 4.47 | 4.47 | 4.47 |
| 4). DAA | 2.55 | 2.55 | 2.55 | 2.55 |
| 5). EBPA | 1.61 | 1.61 | 1.61 | 1.61 |
| 6). Example 1 | 11.04 | — | — | — |
| 7). Example 2 | — | 11.04 | — | — |
| 8). Example 3 | — | — | 11.04 | — |
| 9). Shieldex C303 | — | — | — | 11.04 |
| 10). Resiflow FL2 * | 3.04 | 3.04 | 3.04 | 3.04 |
| 11). Tiona 595 | 4.47 | 4.47 | 4.47 | 4.47 |
| 12). Talc IT Extra | 2.10 | 2.10 | 2.10 | 2.10 |
| 13). Cymel 350 | 1.77 | 1.77 | 1.77 | 1.77 |
| 14). EDBSA | 2.32 | 2.32 | 2.32 | 2.32 |
|  | 100.00 | 100.00 | 100.00 | 100.00 |

* 10% in Solvesso 150
In the above formulation, DBE is a dibasic ester solvent, DAA is diacetone alcohol and EBPA and EDBSA are epoxy blocked phosphoric acid and sulphonic acid catalysts respectively as follows:

| EDBSA | |
|---|---|
| | Parts by weight |
| Ethylene Glycol Acetate | 71.25 |
| Epikote ® 828 | 8.72 |
| Cycat ® 600 | 20.03 |
| | 100.00 |

| EBPA | |
|---|---|
| | Parts by weight |
| Butanol | 51.52 |
| Xylene | 17.20 |
| Epikote ® 828 | 22.20 |
| Phosphoric Acid (85%) | 9.08 |
| | 100.00 |

Coil Coating Topcoat Formulation to assess Examples 1 to 3 on galvanized steel against SHIELDEX ® C303 anticorrosive pigment

| | % by weight |
|---|---|
| 1). Dynapol LH818 (50%) | 27.32 |
| 2). Aerosil 200 | 0.18 |
| 3). Spezialschwarz 4 | 0.46 |
| 4). Lichtgelb 3R | 4.92 |

TABLE 1-continued

| | |
|---|---|
| 5). TiO2 CL310 | 3.01 |
| 6). DBE/DAA 2:1 | 2.37 |
| 7). Disparlon L1984 | 3.64 |
| 8). Bayferrox 140M | 0.91 |
| 9). Solvesso 200 | 6.38 |
| 10). Dynapol LH818 (50%) | 26.23 |
| 11). Syloid ® ED5 | 4.10 |
| 12). Solvesso 200 | 5.01 |
| 13). DBE/DAA 2:1 | 3.64 |
| 14). Cymel 303 | 6.38 |
| 15). Byk Catalyst VP450 | 0.18 |
| 16). Katalysator 1203 | 0.91 |
| 17). Epikote 828 | 0.91 |
| 18). Solvesso 150 | 3.46 |
| | 100.00 |

Resistance to solvent (Methyl Ethyl Ketone) was used on one set of the test panels as a measure of cure of the film, in which the number of double MEK rubs to just remove the coating and expose the underlying metal was determined by means of a cloth soaked in MEK under an approximately 1 Kg load. The remaining coated panels were then prepared for corrosion and chemical resistance testing by introducing a cross-scribe through to the metal and a cut-edge. A region of impact damage was also introduced from the reverse side of the test panel by means of a Gardener Impact Tester (obtainable from Erichsen Test Equipment) under a loading of 160 inch.lbs. After protecting the reverse side of the panels with clear PVC foil, some of the panels were subjected to salt spray according to ASTM B117 for 1000 hours. To assess resistance to alkali, a further set of test panels were immersed in an alkaline bath at a pH of 12 for a period of 7 days. In both cases, following completion of the test, the panels were withdrawn, briefly rinsed, dried and evaluated within 30 minutes.

Evaluation following salt spray involved rating the amount of corrosion formed at the region of impact damage and at the scribed region. Ratings were given on a scale of 0 to 10 in which 0 signifies no breakdown and 10 signifies complete breakdown. Additionally, the amount of adhesion loss at the scribe measured from the scribe in mm was assessed by removing any loosely adhering paint using a knife and sellotape and the extent of edge creepage or blister formation at the cut edge was measured in mm. A visual assessment on the extent of breakdown was given to test panels following exposure to the alkaline solution where ratings were also on a scale of 0 to 10. The results for examples 1 to 3 against SHIELDEX® C303 are shown below in Table 2.

Example 4

Test results on Examples 1 to 3 against the reference pigment are given in Table 2.

TABLE 2

| | Impact Corrosion (0 to 10) | Scribe Rusting (0 to 10) | Scribe Adhesion (mm) | Edge Creepage (mm) | Alkali Resistance (0 to 10) | MEK Resistance (No of rubs) |
|---|---|---|---|---|---|---|
| Example 1 | 1 | 1 | 0 | 3 | 1 | >100 |
| Example 2 | 1 | 1 | 1 | 3 | 1 | >100 |
| Example 3 | 1 | 1 | 1 | 3 | 1 | >100 |
| SHIELDEX C303 | 1 | 1 | 4 | 4 | 3 | 60 |

It can be seen that the examples of the present invention show improved scribe adhesion, alkali resistance and higher levels of cure than the reference pigment.

Example 5

Comparative Example 260 g of a 50% solution of phosphoric acid was charged to a vessel. 1963 g of a 5% by weight aqueous slurry of calcium hydroxide was slowly added with temperature and pH control. During the addition, the maximum temperature reached was 70° C. and the resultant product had a pH of about 6. The resultant product was washed, dried and milled to the desired particle size. X-ray analysis showed the material to be Monetite.

Example 6

475.3 g of a 20% by weight aqueous slurry of precipitated silica having meso porosity and an oil absorption of about 180 as determined by DBP was charged to a vessel and 110.33 g of a 50% solution of phosphoric acid was added. The addition of acid resulted in a considerable reduction in viscosity and consequently easier handling properties. 941.9 g of a 5% by weight aqueous slurry of calcium hydroxide was slowly added with temperature and pH control. The maximum temperature reached was 30° C. and the resultant product had a pH of about 7. The resultant product was washed, dried and milled to the desired particle size. X-ray analysis showed the phosphate phase to be Brushite. The precipitated silica is obtainable as PERKASIL® SM604, available from W. R. Grace & Co. Conn.

Example 7

475.3 g of a 20% by weight aqueous slurry of precipitated silica having meso porosity and an oil absorption of about 180 as determined by DBP was charged to a vessel and 110.33 g of a 50% solution of phosphoric acid was added. The addition of acid resulted in a considerable reduction in viscosity and consequently easier handling properties. 915.42 g of a 5% by weight aqueous slurry of calcium hydroxide and magnesium hydroxide in a molar calcium to magnesium ratio of 85:15, was slowly added with temperature and pH control. The maximum temperature reached was 30° C. and the resultant product had a pH of about 7. The resultant product was washed, dried and milled to the desired particle size. X-ray analysis showed the main phosphate phase to be Brushite. The precipitated silica is obtainable as PERKASIL® SM604, available from W. R. Grace & Co. Conn.

Example 8

84.44 g of a 50% solution of phosphoric acid was charged to a vessel and 75 g of a porous silica gel having a pore volume of about 1.6 mls/g as determined by $N_2$ adsorption was added to produce a slurry concentration of 30%. Without the acid, a slurry concentration of only about 10% would have been feasible. 700.58 g of a 5% by weight aqueous slurry of calcium hydroxide and magnesium hydroxide in a molar calcium to magnesium ratio of 85:15, was slowly added with temperature and pH control. The maximum temperature reached was 30° C. and the resultant product had a pH of about 7. The resultant product was washed, dried and milled to the desired particle size. X-ray analysis showed the main phosphate phase to be Brushite. The silica gel is obtainable as SYLOID® 244, available from W. R. Grace & Co. Conn.

Example 9

57 g of a 50% solution of phosphoric acid combined with 2-hydroxyphosphonacetic acid in a molar ratio of 95:5 was charged to a vessel and 48.5 g of a porous silica gel having a pore volume of about 1.6 mls/g as determined by $N_2$ adsorption was added to produce a slurry concentration of 30%. 460.2 g of a 5% by weight aqueous slurry of calcium hydroxide and magnesium hydroxide in a molar calcium to magnesium ratio of 85:15, was slowly added with temperature and pH control. The maximum temperature reached was 30° C. and the resultant product had a pH of about 7. The resultant product was washed, dried and milled to the desired particle size. X-ray analysis showed the main phosphate phase to be Brushite. The silica gel is obtainable as SYLOID® 244, available from W. R. Grace & Co. Conn.

Anti-corrosive tests were also carried out on Example 6 to 9. In this case, a water-borne acrylic dispersion was used as the test medium and cold rolled steel was used as the substrate. Coatings, containing the examples were applied by applicator bar to the test panels (Q-Panels S412 available from the Q-Panel Co.) so as to obtain a dry film thickness of about 40 μm. Drying was for seven days at room temperature. Examples 6 to 9 are zinc-free and were compared against a representative commercially available zinc based anti-corrosive pigment, Heucophos® ZPO (available from Heubach GmbH) which is commonly used in water-borne acrylic coatings. SHIELDEX® AC5 (available from W. R. Grace & Co. Conn.) and Heucophos® CHP (available from Heubach GmbH), commercially available zinc-free anti-corrosive pigments, were also included as references. Example 5 was used as a reference too, representing a pigment similar to examples 6 to 9 but without inorganic oxide. The formulations employed are given below in Table 3.

TABLE 3

Water-Borne Acrylic Formulations to assess Examples 6 to 9 on cold rolled steel against SHIELDEX ® C303, Heucophos ® ZPO and Heucophos ® CHP anticorrosive pigments.

| | 1 | 2 | 3 | 4 | 5 |
|---|---|---|---|---|---|
| 1). NeocrylXK-85 | 11.20 | 11.20 | 11.20 | 11.20 | 11.20 |
| 2). Water | 5.23 | 5.23 | 5.23 | 5.23 | 5.23 |
| 3). Drew 210-693 | 0.14 | 0.14 | 0.14 | 0.14 | 0.14 |
| 4). Disperse-Ayd W33 | 1.43 | 1.43 | 1.43 | 1.43 | 1.43 |
| 5). Acrysol TT935 | 0.29 | 0.29 | 0.29 | 0.29 | 0.29 |
| 6). Water | 0.30 | 0.30 | 0.30 | 0.30 | 0.30 |
| 7). Ser-AD FA179 | 0.48 | 0.48 | 0.48 | 0.48 | 0.42 |
| 8). Butyl Glycol | 2.15 | 2.15 | 2.15 | 2.15 | 2.15 |
| 9). Neocryl BT-24 | 2.74 | 2.74 | 2.74 | 2.74 | 2.74 |
| 10). Aerosil R972 | 0.57 | 0.57 | 0.57 | 0.57 | 0.57 |
| 11a). Example 5 | 3.39 | — | — | — | — |
| 11b). Examples 6 to 9 | — | 3.39 | — | — | — |
| 11c). Shieldex ® AC5 | — | — | 3.39 | — | — |
| 11d). Heucophos ZPO | — | — | — | 6.72 | — |
| 11e). Heucophos CHP | — | — | — | — | 6.72 |
| 12). $TiO_2$ Kronos 2190 | 4.31 | 4.31 | 4.31 | 4.15 | 4.15 |
| 13). Talc 20MOOS | 10.18 | 10.18 | 10.18 | 9.81 | 9.81 |
| 14). Hostatint Black GR-30 | 0.81 | 0.81 | 0.81 | 0.78 | 0.78 |
| 15). Neocryl XK-85 | 44.66 | 44.66 | 44.66 | 42.64 | 42.64 |
| 16). Texanol | 1.11 | 1.11 | 1.11 | 1.11 | 1.11 |
| 17). Nacorr 1652 | 1.91 | 1.91 | 1.91 | 1.91 | 1.91 |
| 18). Resydrol AX 237W | 5.06 | 5.06 | 5.06 | 5.06 | 5.06 |
| 19). Butyl Glycol | 2.42 | 2.42 | 2.42 | 2.42 | 2.42 |
| 20). Octa Soligen Co-10% | 0.06 | 0.06 | 0.06 | 0.06 | 0.06 |
| 21). Ammonia 25% | 0.36 | 0.36 | 0.36 | 0.36 | 0.36 |
| 22). Water | 1.20 | 1.20 | 1.20 | 0.96 | 0.96 |
| | 100.00 | 100.00 | 100.00 | 100.00 | 100.00 |

The coated panels were scribed through to the metal and subjected to salt spray (according to ASTM B117) for 240 hours. Subsequently, the panels were briefly rinsed, dried and evaluated within 30 minutes of withdrawal from the salt spray cabinet.

Evaluation following salt spray involved rating the amount of corrosion formed at the scribed region, the amount of blistering and the amount of through film corrosion formed over the surface of the test panel. Ratings were given on a scale of 0 to 10 in which 0 signifies no breakdown and 10 signifies complete breakdown. Additionally, the amount of adhesion loss at the scribe measured from the scribe in mm was assessed by removing any loosely adhering paint using a knife and sellotape. The extent of adhesion loss over the surface of the panel was also assessed by means of a cross-hatch test, removing any loosely adhering paint by means of sellotape following cross-hatching. Ratings were given on a scale of 0 to 5 with 5 indicating complete adhesion loss. The results for Examples 6 to 9 against Example 5, SHIELDEX® AC5, Heucophos® ZPO and Heucophos® CHP are shown below in Table 4.

Example 10

Test results on Examples 6 to 9 compared to the references are given in Table 4 below.

TABLE 4

|  | Scribe Rusting (0 to 10) | Scribe Adhesion (mm) | Blistering (0 to 10) | Through Film Corrosion (0 to 10) | Cross-hatch Adhesion (0 to 5) |
|---|---|---|---|---|---|
| Example 5 (Reference) | 6 | 1 | 3 | 7 | 3 |
| Example 6 | 4 | 0 | 1 | 4 | 1 |
| Example 7 | 3 | 0 | 1 | 4 | 0 |
| Example 8 | 2 | 0 | 1 | 4 | 0 |
| Example 9 | 2 | 0 | 0 | 3 | 0 |
| SHIELDEX AC5 | 7 | 2 | 4 | 9 | 2 |
| Heucophos ZPO | 5 | 1 | 0 | 2 | 4 |
| Heucophos CHP | 6 | 1 | 4 | 7 | 2 |

The results in Table 4 demonstrate that the examples of the present invention provide superior anticorrosion properties compared to the commercially available heavy metal and zinc-free reference pigments, particularly in terms of scribe rusting, scribe adhesion, cross-hatch adhesion, blister resistance and through film corrosion resistance. Compared to the zinc-based reference, the examples of the present invention again showed less scribe rusting and adhesion loss and better cross-hatch adhesion, performing similarly or quite closely in resistance to blistering and through film corrosion.

While the invention has been described with a limited number of embodiments, these specific embodiments are not intended to limit the scope of the invention as otherwise described and claimed herein. It may be evident to those of ordinary skill in the art upon review of the exemplary embodiments and description herein that further modifications and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5%. . . . 50%, 51%, 52%. . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description. Such modifications are intended to fall within the scope of the appended claims.

What is claimed is:

1. A dispersion of anti-corrosive particles comprising:
(a) fluid, and
(b) anti-corrosive particles comprising inorganic oxide particles modified with polyvalent metal cations, and having at least one of (i) mesoporosity and (ii) macroporosity such that an average pore size of said anti-corrosive particles is at least 3 nm and an average pore volume of said anti-corrosive particles is at least about 0.2 ml/g.

2. A dispersion according to claim 1, wherein said average pore size is between about 4 nm and 50 nm.

3. A dispersion according to claim 1, wherein the inorganic oxide particles comprise precipitated silica or a mixture of inorganic oxide particles at least one component of which is precipitated silica.

4. A dispersion according to claim 1, wherein the inorganic oxide particles comprise silica gel or a mixture of inorganic oxide particles at least one component of which is silica gel.

5. A dispersion according to claim 1, wherein said fluid comprises water, complexing agent, binder, film former, bacteriacide or polymer.

6. A dispersion according to claim 1, wherein said anti-corrosive particles have an average particle size of less than about 10 µm.

7. A dispersion according to claim 6, wherein said average pore volume is from about 0.2 ml/g to about 3 ml/g.

8. A dispersion according to claim 6, wherein said average pore volume is from about 0.4 m/g and 1.2 ml/g.

9. A dispersion according to claim 1, wherein said anti-corrosive particles have an average particle size of less than about 1 µm.

10. The dispersion according to claim 1, wherein the anti-corrosive inorganic oxide particles comprise silica particles and have an average pore size between about 4 nm and 50 nm and an average pore volume of from about 0.4 ml/g to 1.2 ml/g; and the polyvalent metal cations comprise calcium, magnesium, or a combination thereof.

11. The dispersion according to claim 10, wherein the polyvalent metal cations comprise calcium and magnesium.

12. A coating comprising the dispersion of claim 1.

13. A powder of anti-corrosive particles comprising:
anti-corrosive particles comprising inorganic oxide particles modified with polyvalent metal cations, and having at least one of (i) mesoporosity and (ii) macroporosity such that an average pore size of said anti-corrosive particles is at least 3 nm and an average pore volume of said anti-corrosive particles is at least about 0.2 ml/g.

14. A powder according to claim 13, wherein said average pore size is between about 4 nm and 50 nm.

15. A coating comprising the powder of claim 13.

16. A dispersion of anti-corrosive particles comprising:
(a) fluid, and
(b) anti-corrosive inorganic oxide particles having at least one of (i) mesoporosity and (ii) macroporosity such that said particles have an average pore size of at least 3 nm and an average pore volume of at least about 0.2 ml/g, said particles being modified with polyvalent metal cations, and optionally comprising inorganic or organic anions of weak acids and their conjugate species defined in terms of a number of moles of an $i^{th}$ cation, anion or oxide represented by symbols $m_i^c$, $m_i^a$ and $m_i^o$ respectively; a total number of moles of each component given by the sum over all cations, anions and oxides that are to be employed where an upper bar signifies that more than one cation, anion or oxide may be involved in the dispersion:

$\Sigma m_i^c = \overline{m_c}$ $\Sigma m_i^a = \overline{m_a}$ $\Sigma m_i^o = \overline{m_o}$ where $\overline{m_c}$, $\overline{m_a}$ and $\overline{m_o}$, are a total number of moles of cations, anions and oxides respectively;

$\overline{m_{c,a}}$ and $\overline{m_{c,o}}$ are a total number of moles of cations associated with the anion and oxide respectively; a proportion of the $i^{th}$ cation, anion and oxide as a fraction of the total number of cations, anions and oxides $c_i$, $a_i$, and $o_i$:

$$\frac{m_i^c}{\overline{m_c}} = c_i$$

$$\frac{m_i^a}{\overline{m_a}} = a_i$$

and $$\frac{m_i^o}{\overline{m_o}} = o_i$$

a total number of polyvalent metal cations ($\overline{m_c}$), inorganic oxides ($\overline{m_o}$) and anions ($\overline{m_a}$) making up the dispersion expressed in moles being determined by the following set of equations, where symbols s and n refer to a surface area per gram of oxide and number of surface hydroxyl groups per nm² of oxide, determined as an average where more than one oxide is involved:

$$\overline{m_c} = \overline{m_{c,o}} + \overline{m_{c,a}}$$

where $$\overline{m_{c,o}} = \frac{f \times s \times n \times \overline{m_o} \times M_o \times 10^{18}}{\overline{v_c} \times N_A} = b \times \overline{m_o} \quad f \leq 1$$

and $$\overline{m_{c,a}} = \frac{\overline{v_a} \times \overline{m_a}}{\overline{v_c}} \times s = c \times \overline{m_a} \quad s > 1 \text{ or } s \leq 1$$

using symbols b and c to represent a combination of terms in each equation, together with a relationship expressing a desired ratio r of anion to oxide:

$$\frac{\overline{m_a}}{\overline{m_o}} = \frac{1+b}{1+c} \times r \quad r \geq 0$$

using as a basis a constraint that:

$\overline{m_a} + \overline{m_o} + \overline{m_c} = 100$ wherein the symbol f gives a theoretical proportion of surface hydroxyl groups involved in treatment with a cation, the symbol s determines a stochiometric ratio between cations and anions and symbols $\overline{v_c}$ and $\overline{v_a}$ represent an average valence of the cations and anions making up the dispersion and are determined in each case by the following form:

$$\overline{v_i} = \frac{\sum z_i \times u_i}{\sum u_i}$$

wherein $z_i$ and $u_i$ are a valence and a proportion of the $i^{th}$ cation or anion as a fraction of the total number of cations or anions, $c_i$ or $a_i$, $M_c$, $M_a$ and $M_o$ are the molecular weights of the cation, anion and oxide or represent average values as appropriate and $N_a$ is the Avagadro Number.

17. A dispersion according to claim 16, wherein said average pore size is between about 4 nm and 50 nm.

18. A dispersion according to claim 16, wherein the inorganic oxide comprises silica, alumina, titanium, or mixtures thereof.

19. A dispersion according to claim 16, wherein the inorganic oxide particles comprise precipitated silica or a mixture of inorganic particles at least one component of which is precipitated silica.

20. The dispersion according to claim 16, wherein the anti-corrosive inorganic oxide particles comprise silica particles and have an average pore size between about 4 nm and 50 nm and an average pore volume of from about 0.4 m/g to 1.2 ml/g; and the polyvalent metal cations comprise calcium, magnesium, or a combination thereof.

21. The dispersion according to claim 20, wherein the anti-corrosive inorganic oxide particles further comprise inorganic or organic anions of weak acids and their conjugate species.

\* \* \* \* \*